Feb. 7, 1967   J. L. YOUNG ETAL   3,302,901
FLUID DRIVE SYSTEM FOR FILM TAKE-UP AND REWIND MECHANISM
Filed April 22, 1965   3 Sheets-Sheet 1
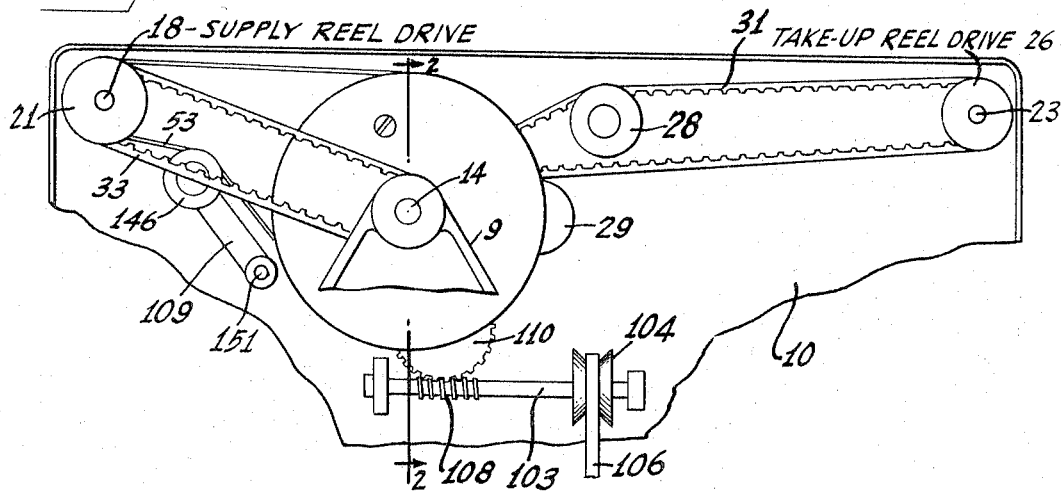
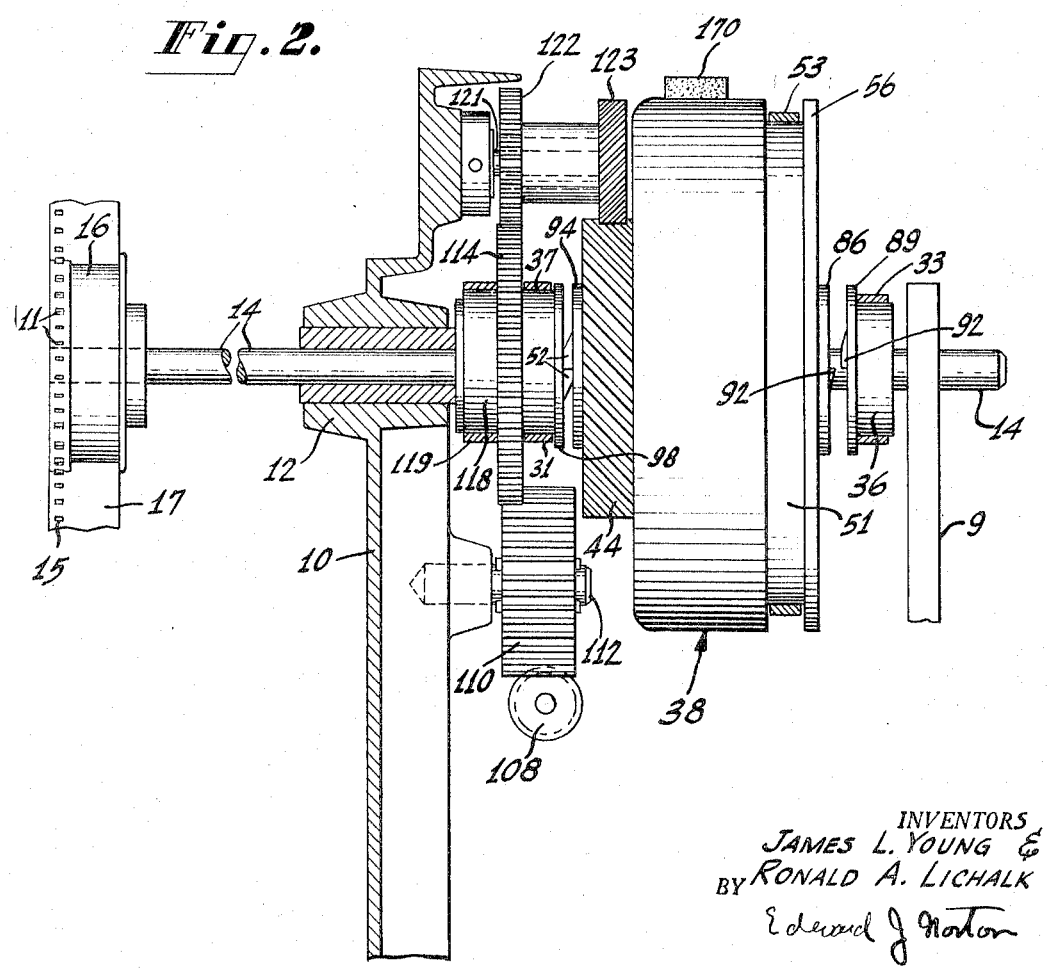
INVENTORS
JAMES L. YOUNG &
BY RONALD A. LICHALK
Edward J Norton
Attorney Feb. 7, 1967 J. L. YOUNG ETAL 3,302,901
FLUID DRIVE SYSTEM FOR FILM TAKE-UP AND REWIND MECHANISM
Filed April 22, 1965 3 Sheets-Sheet 2
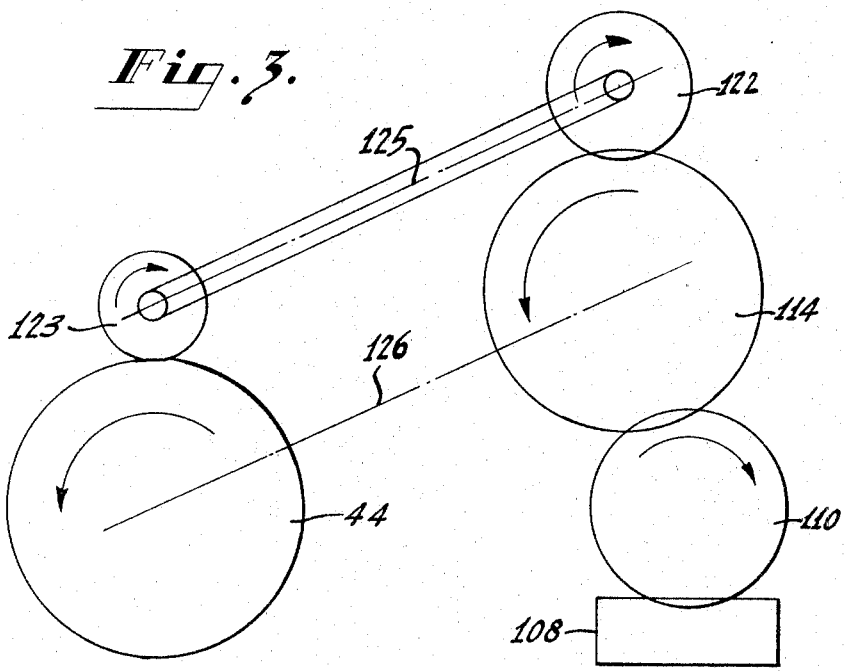
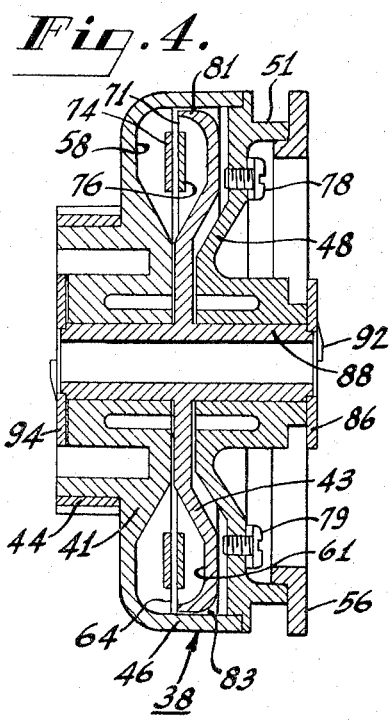
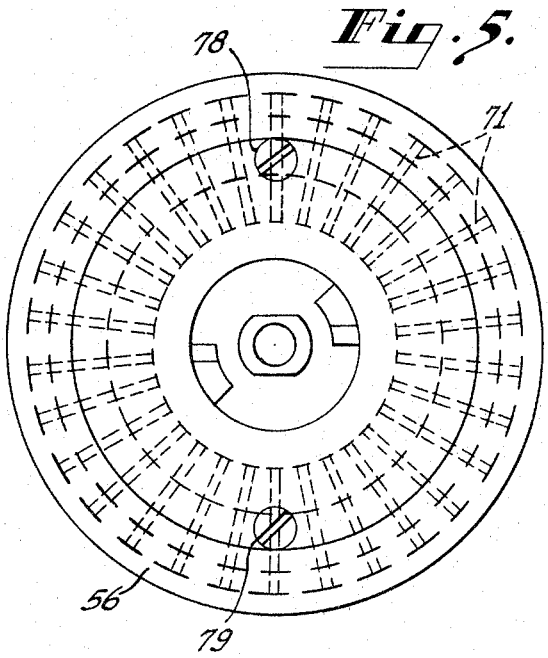
INVENTORS
JAMES L. YOUNG &
BY RONALD A. LICHALK
Edward J. Norton
Attorney

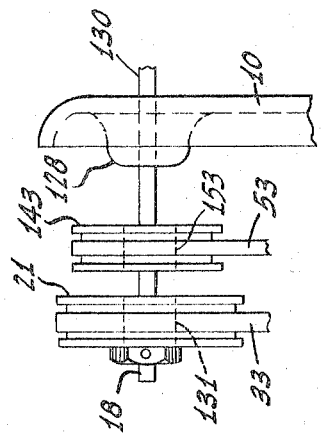
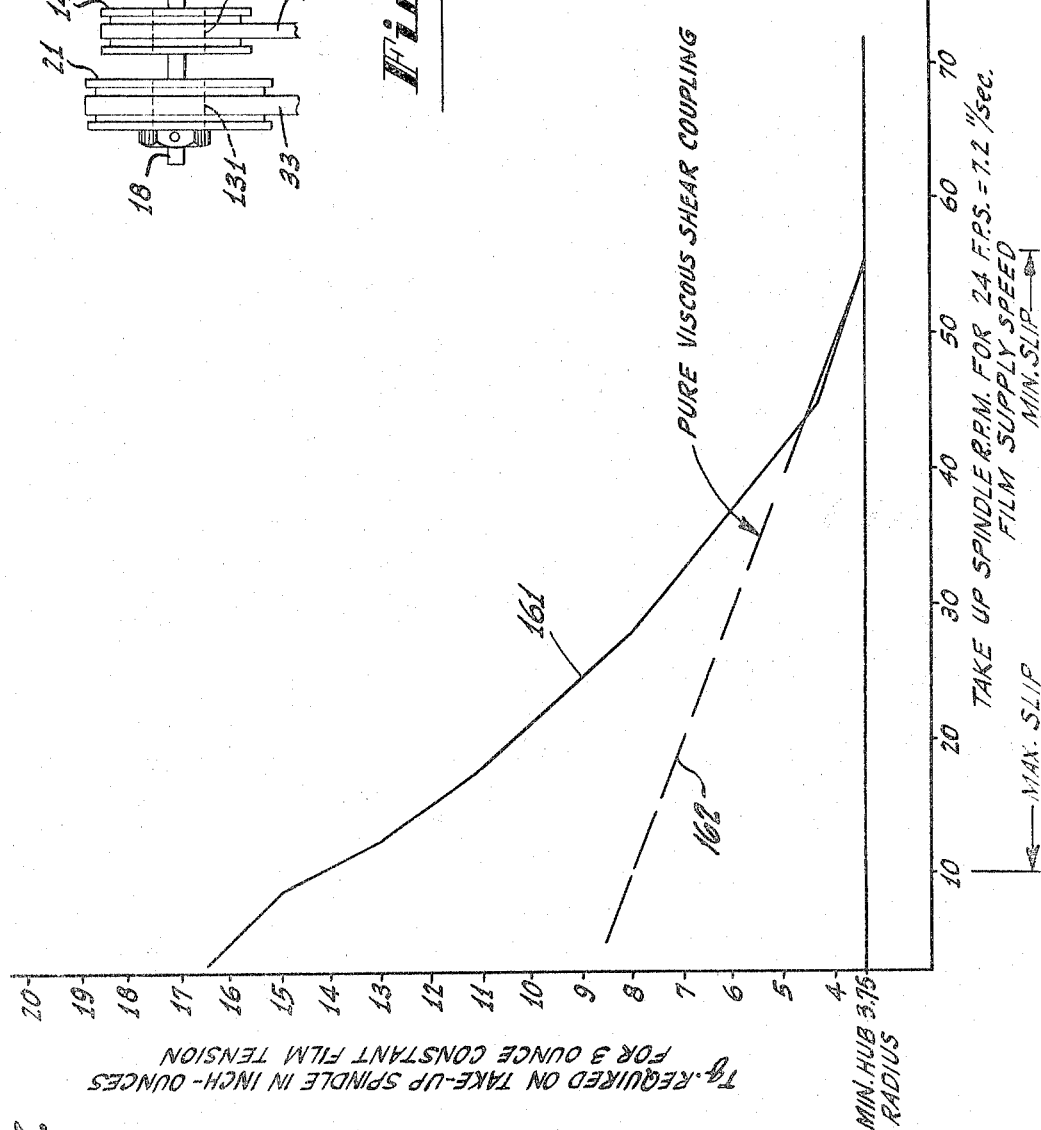

United States Patent Office 3,302,901
Patented Feb. 7, 1967

3,302,901
FLUID DRIVE SYSTEM FOR FILM TAKE-UP AND REWIND MECHANISM
James L. Young, Canonsburg, and Ronald A. Lichalk, Pittsburgh, Pa., assignors to Radio Corporation of America, a corporation of Delaware
Filed Apr. 22, 1965, Ser. No. 449,960
8 Claims. (Cl. 242—55.12)

The present invention relates to film transport systems, and more particularly to a novel reversible drive system employing a fluid coupling for driving reels serving, for example, as supply and take-up reels in motion picture apparatus.

The principal object of the present invention is to provide a novel, reversible film take-up system.

A further object of the present invention is to provide a novel take-up and fast rewind system.

A still further object of the present invention is to provide in a novel manner for reversing the direction of film movement at projection transport speed by reversing the input drive direction.

A still further object of the present invention is to provide a film take-up drive employing a fluid coupling having a combined viscous shear or drag action combined with the hydrokinetic drive.

The invention, while described herein as embodied in a motion picture projector, is generally applicable to strip drive and reeling systems.

In accordance with one embodiment of the present invention to be described, a fluid coupling comprising a power driven impeller and a runner is arranged to drive either reel of a motion picture projector, for example, by simply reversing direction of rotation of the power driven impeller. The fluid coupling is mounted for axial movement on the projector sprocket drive shaft. A member driven by the runner engages the supply reel drive means by axial movement of the fluid coupling in one direction and the take-up reel drive means by axial movement in the other direction. Axial movement is caused by reversible end thrust produced by a helical pinion driving a helical gear secured to the fluid coupling body or housing. Fast rewind is provided by direct drive of the supply reel by a large pulley and belt controlled by a movable idler. The large pulley is a part of or is fixed to the fluid coupling housing. The slower reverse drive to the supply reel being through a one way clutch is ineffective at this time.

The fluid coupling of this invention combines the hydrokinetic drive effect with viscous fluid friction drag between the impeller and runner to provide substantially constant film tension as the diameter of reeled film and reel speed change.

The invention will be described in greater detail by reference to the accompanying drawing in which:

FIG. 1 is a view in rear elevation of a portion of the mechanism of a motion picture projector embodying the invention showing location of the reel shafts and sprocket shaft;

FIG. 2 is an enlarged view in side elevation, partly in section on line 2—2, of FIG. 1;

FIG. 3 is a diagrammatic showing of the relative location of the shafts shown in FIG. 2;

FIG. 4 is a sectional elevation of the fluid coupling of FIG. 1;

FIG. 5 is a view in front elevation of the fluid coupling;

FIG. 6 is a fragmentary enlarged plan view showing details of the mechanism for imparting driving power to the supply reel drive; and FIG. 7 is a set of curves illustrating one or more advantages of the invention.

The invention is shown in the accompanying drawing as being embodied in a motion picture projector with parts omitted not helpful in understanding the invention. Referring to FIGS. 1 and 2 of the drawing, the projector frame 10, shown fragmentarily, is provided with a bearing 12 for a sprocket shaft 14 to which is fixed a sprocket 16. Sprocket teeth 11 serve to positively engage with sprocket perforations 15 in film 17. As shown in FIG. 1 the frame 10 provides support for a shaft 18 carrying the supply reel drive or reverse drive toothed pulley 21. The shaft 14 is also supported by a bearing in a bracket 9 suitably secured to the frame 10. Also, a shaft 23 carries a take-up reel drive toothed pulley 26. A pair of idler pulleys 28 and 29 serve as guides for the take-up reel drive belt 31. The belt 31 and the supply reel drive belt 33 are, preferably, positive drive belts provided with teeth for engagement with the cooperating teeth on the driving and driven pulleys, respectively.

Referring now to FIG. 2 the shaft 14 carries two toothed pulleys 36 and 37 rotatably mounted thereon. The pulley 36 receives the supply reel belt 33 and is restrained from axial movement in any suitable manner permitting free rotation on the shaft 14. The pulley 37 receives the belt 31. The fluid clutch assembly, designated generally by reference character 38, is rotatably and slidably carried by the shaft 14.

Referring to FIGS. 4 and 5 the fluid clutch assembly comprises an impeller 41 and a runner 43. A helical gear 44 is secured on the impeller 41 to drive the assembly 38 and cause it to shift axially in either direction in a manner to be explained. A peripheral flange 46 receives a cover plate 48, the parts being secured together in any suitable manner. The outer periphery of the cover plate 48 is reduced in diameter at 51 to provide a pulley surface to receive a flat rewind belt 53 (FIG. 1). A flange 56 serves as a belt guide and completes the recessed contour of the pulley.

The impeller 41 presents a peripheral recess 58 and the runner 43 is formed near its outer periphery to provide a similarly shaped recess 61. The contours 58 and 61 cooperate to provide a torus which will be liquid filled, for example, with a light oil, by centrifugal force in operation of the coupling in the manner usual in fluid couplings. A series of vanes 64 are spaced around the interior of the recess 58. A cooperating set of vanes 71 is spaced around the recess 61. Flow control rings 74 and 76 are secured to the edges of the vanes 64 and 71, respectively. Liquid filling openings for the coupler are covered and sealed by screws 78 and 79. The arrangement of the vanes 71 and of the fluid coupling is shown in FIG. 5. The coupling is not completely filled with liquid to allow room for heat expansion of the liquid.

The outer peripheral flange 81 of the runner 43 is spaced from the interior of the peripheral flange 46. This provides a viscous shear or viscous drag effect by action of liquid in the region 83 between the flanges 46 and 81. This action is in addition to the usual operation of a fluid coupling which depends upon centrifugal force on the liquid in the recess 58 between the vanes 64 which is forced outwardly acquiring kinetic energy which is transferred to the vanes 71 in the runner. The liquid has a dual motion. It travels with the impeller and runner around the axis of the coupling and flows around the central core of the torus.

A clutch part 86 of a one-way or overrunning clutch is secured to the hub 88 of the runner 43. The mating one-way clutch part 89 (FIG. 2) is secured to the loose pulley 36. The clutch parts are provided with projecting teeth 92 which cooperate in driving engagement when the fluid coupling 38 moves axially to the right as viewed in FIG. 2. One-way clutch part 94, similar to the clutch part 86, engages a clutch part 98 secured to the loose pulley 37 when the fluid coupling 38 moves axially to the left as viewed in FIG. 2.

The sprocket shaft 14 is driven from a motor driven worm shaft 103 to which is secured a pulley 104 (FIG. 1). The latter is driven by a belt 106 from the projector motor (not shown). The driving worm 108 on the shaft 103 is meshed with a helical gear 110 journaled on a stub shaft 112 secured to the frame 10. A gear 114 is secured to the shaft 14 to drive the sprocket 16. A pulley 118 is also secured to the shaft 14 to receive a belt 119 for driving the lower projector sprocket (not shown). A stub shaft 121, secured in the frame 10, rotatably supports a gear cluster comprising helical pinions 122 and 123 which are secured for rotation together on the shaft 121.

In the illustrative embodiment the gear 44 and pinion 122 are right hand helical gears and the gear 114 and the pinion 123 are left hand helical gears. By way of example, the worm 108 is right handed and has a helix angle of 17 degrees as does the gear 110, and, also, the gears 114, 122. The gears 123 and 44 have a helix angle of 45 degrees. To simplify the drawing gears 110 and 114 and pinion 122 are shown as simple spur gears. In FIG. 3, reference character 125 represents the axis of the pinions 122 and 123, and reference character 126 represents the axis of the shaft 14. An example of a reversible film drive is shown in U.S. Patent No. 3,016,211, granted January 9, 1962.

Referring now to FIG. 6, showing the nature of the mechanism for imparting power to the supply reel drive 21, 18, a bearing sleeve 128 is formed on or secured in and projects from the frame 10 to support the drive shaft 18. The shaft 18 extends through the frame 10 at 130 to any suitable connection with the supply reel arm and drive mechanism (neither shown).

The pulley 37 receives the positive drive belt 31 (FIG. 2), as stated above, to drive the take-up reel mechanism directly inasmuch as it is not usually necessary to operate this mechanism at a higher rewind speed.

The pulley 21 receives the positive drive belt 33 engaged with the pulley 36 (FIG. 2). The pulley 21 contains an internal one-way ratchet clutch 131 details not shown one portion of which is secured to the shaft 18. Suitable types of one-way clutch are described and illustrated in a book having the title "Torque Converters" written and published by P. M. Heldt. Chapter IV of this book is devoted to this type of clutch. The previously mentioned fast rewind belt 53 is engaged in the pulley groove 51 of the fluid coupling 38 and drives a pulley 143 on the shaft 18 of the supply reel drive when the belt 53 is tightened by an idler pulley 146 mounted on a swingable arm 109 (FIG. 1). The arm is moved by any suitable handle (not shown) which imparts rotation to the shaft 151. The pulley 143 also contains an internal one-way ratchet clutch 153 of any suitable type. This clutch may be of the same type as the clutch 131.

In operation of the take-up and rewind mechanism of this invention and assuming that normal forward operation of the film is to be achieved, the housing and gear 44 of the fluid coupling assembly 38 are rotated in a counter-clockwise direction as indicated by the arcuate arrow on FIG. 3 which causes the clutch parts 94 and 98 to engage and drive the take-up reel 23. This is accomplished by end thrust of the gear and pinion combination 44 and 123. A friction pad 170 supported in any suitable manner on the frame 10 may be employed to aid in this by exerting a retarding effect or drag to increase end thrust at start. Simply reversing the direction of drive of worm 108 causes the clutch parts 86 and 89 to be engaged to drive the supply reel 21 in the reverse direction to obtain special effects such as reversal of the time sequence of the exhibited pictures. In the event that fast rewind is desired, the rotation of the worm 108 is reversed so that the clutch housing and gear 44 rotate in a clockwise direction as viewed on FIG. 3 and the idler pulley 146 (FIG. 1) is employed to tighten the belt 53 thereby driving the pulley 143 (FIG. 6) on the shaft 18 of the supply reel drive at a high speed. High rewind speed is readily obtained because of direct drive which bypasses the fluid elements of the coupling and the large diameter of the pulley groove 51 as compared to the diameter of the pulley 143. The one-way clutch drive 131 for the pulley 21 permits this high speed rotation.

Referring to FIG. 7 of the drawing it will be seen that the curve 161 provides a good approximation of the proper relationship of torque to spindle speed to maintain a desired, for example three ounce, constant film tension. Curve 162 shows the characteristic which would be obtained by a drive employing pure viscous shear in the absence of the hydro-kinetic effect of the fluid coupling. Speeds in r.p.m. and reel diameters are illustrated solely by way of example for one embodiment of the invention which was tested.

What is claimed is:
1. Drive and reeling mechanism for a strip comprising:
   strip take-up means,
   strip supply means,
   means positively engaging said strip to impart movement thereto,
   positive drive means for said strip engaging means,
   a fluid coupling comprising an impeller and a runner driven thereby,
   means to drive said impeller from said positive drive means,
   clutch means associated with said runner for engagement with said strip take-up means,
   a second clutch means on said runner for engagement with said strip supply means,
   and means associated with said fluid coupling for urging either of said clutch means into driving engagement in response to rotational direction of the power input to said coupling.

2. Drive and reeling mechanism for a strip comprising:
   strip take-up means,
   strip supply means,
   a sprocket positively engaging said strip to impart movement thereto,
   positive drive means for said sprocket,
   a fluid coupling comprising an impeller and a runner driven thereby,
   means to drive said impeller from said positive drive means,
   clutch means associated with said runner for engagement with said strip take-up means,
   a second clutch means on said runner for engagement with said strip supply means,
   and means associated with said impeller drive means for urging either of said clutch means into driving engagement in response to rotational direction of the power input to said coupling.

3. Drive and reeling mechanism for a strip comprising:
   strip take-up means,
   strip supply means,
   means positively engaging said strip to impart movement thereto,
   positive drive means for said strip engaging means,
   a fluid coupling comprising an impeller and a runner driven thereby,
   gear means to drive said impeller from said positive drive means,
   clutch means associated with said runner for engagement with said strip take-up means,
   a second clutch means on said runner for engagement with said strip supply means,
   and helical gear means urging either of said clutch means into driving engagement in response to rotational direction of the power input to said coupling.

4. Drive and reeling mechanism for a film comprising:
film take-up means,
film supply means,
a power driven shaft,
a film driving sprocket on said power driven shaft,
a fluid coupling rotatably mounted on said shaft,
said fluid coupling comprising an impeller and a runner,
means to drive said impeller from said power driven shaft,
a pulley of one diameter on said impeller for driving said supply means at a certain speed,
a second pulley journaled on said power driven shaft for driving said supply means when said impeller rotates in one direction, and
a third pulley journaled on said power driven shaft for driving said take-up means when said impeller rotates in the opposite direction.

5. Drive and reeling mechanism for a strip comprising:
strip take-up means,
strip supply means,
means positively engaging said strip to impart movement thereto,
positive drive means for said strip engaging means,
a fluid coupling comprising a housing,
an impeller carried by said housing,
power drive means to drive said housing and said impeller,
a runner in said housing to be driven from said impeller by hydro-kinetic action,
means to cause said housing to exert a viscous drag effect on said runner,
clutch means associated with said runner for engagement with said film take-up means,
a second clutch means on said runner for engagement with said strip supply means,
and means associated with said fluid coupling for urging either of said clutch means into driving engagement in response to rotational direction of the power input to said coupling.

6. Driving mechanism for a film comprising:
a sprocket shaft,
a stationary support providing a bearing for said shaft,
means for driving said sprocket shaft comprising a gear secured thereon,
a sprocket for positive film engagement secured to said shaft,
a fluid coupling comprising a liquid containing housing,
an impeller in said housing,
a hub journaled in said housing and being rotatably and slidably carried by said sprocket shaft,
a runner cooperating said impeller secured to said hub,
a helical gear secured on said housing,
a helical pinion meshed with said helical gear and axially fixed but journaled on a second bearing provided by said stationary support,
pinion means driving said helical pinion from said first named gear,
a pulley rotatably journaled on said sprocket shaft,
a one-way clutch comprising cooperating clutch members,
one of said one-way clutch members surrounding said sprocket shaft and secured to said hub,
the other of said one-way clutch members surrounding said sprocket shaft and secured to said pulley,
take-up reel drive means comprising a driven shaft spaced from and parallel to said sprocket shaft,
a take-up drive pulley secured to said driven shaft, and
a belt operatively coupling said pulley and said take-up drive pulley.

7. Driving and fast rewinding mechanism for a film comprising:
a sprocket shaft,
a stationary support providing a bearing for said shaft,
means for driving said sprocket shaft comprising a gear secured thereon,
a sprocket for positive film engagement secured to said shaft,
a fluid coupling comprising liquid containing housing,
an impeller in said housing,
a hub journaled in said housing and being rotatably and slidably carried by said sprocket shaft,
a runner cooperating said impeller secured to said hub,
a helical gear secured on said housing,
a helical pinion meshed with said helical gear and axially fixed but journaled on a second bearing provided by said stationary support,
pinion means driving said helical pinion from said first named gear,
a toothed pulley rotatably journaled on said sprocket shaft,
a one-way clutch comprising cooperating clutch members, one of said one-way clutch members surrounding said sprocket shaft and secured to said pulley,
the other of said one-way clutch members surrounding said shaft and secured to said hub,
supply reel drive means comprising a driven shaft spaced from and parallel to said sprocket shaft,
a toothed reverse drive pulley,
a one-way clutch for driving said driven shaft from said reverse drive pulley,
a belt operatively coupling said pulley on said sprocket shaft and said reverse drive pulley,
pulley means on said fluid drive housing,
rewind drive means for said driven shaft comprising a rewind drive pulley,
a one-way clutch for driving said driven shaft from said rewind drive pulley,
belt tightening means carried by said stationary support, and
a belt engageable by said belt tightening means and operatively coupling said pulley means on said housing and said rewind drive pulley.

8. Reversible driving and fast rewinding mechanism for a film comprising:
a sprocket shaft,
a stationary support providing a bearing for said shaft,
means for driving said sprocket shaft comprising a gear secured thereon,
a sprocket for positive film engagement secured to said shaft,
a fluid coupling comprising liquid containing housing,
an impeller in said housing,
a hub journaled in said housing and being rotatably and slidably carried by said sprocket shaft,
a runner cooperating said impeller secured to said hub,
a helical gear secured on said housing,
a helical pinion meshed with said helical gear and axially fixed but journaled on a second bearing provided by said stationary support,
pinion means driving said helical pinion from said first named gear,
a toothed pulley rotatably journaled on said sprocket shaft,
a one-way clutch comprising cooperating clutch members, one of said one-way clutch members surrounding said sprocket shaft and secured to said pulley,
the other of said one-way clutch members surrounding said shaft and secured to said hub,
supply reel drive means comprising a driven shaft spaced from and parallel to said sprocket shaft,
a toothed reverse drive pulley,
a one-way clutch for driving said driven shaft from said reverse drive pulley,
a belt operatively coupling said pulley on said sprocket shaft and said reverse drive pulley,
pulley means on said fluid drive housing,
rewind drive means for said driven shaft comprising a rewind drive pulley, a one-way clutch for driving said driven shaft from said rewind drive pulley, belt tightening means carried by said stationary support, a belt engageable by said belt tightening means and operatively coupling said pulley means on said housing and said rewind drive pulley, a second toothed pulley rotatably journaled on said sprocket shaft, a second one-way clutch comprising second cooperating clutch members, one of said second one-way clutch members surrounding said sprocket shaft and secured to said hub opposite said first named one-way clutch member, the other of said second one-way clutch members surrounding said sprocket shaft and secured to said second toothed pulley, take-up reel drive means comprising a second driven shaft spaced from and parallel to said sprocket shaft, a toothed take-up drive pulley secured to said second driven shaft, and a belt operatively coupling said second toothed pulley and said take-up drive pulley.

References Cited by the Examiner
UNITED STATES PATENTS

| | | | |
|---|---|---|---|
| 2,858,996 | 11/1958 | Switzer | 242—55.12 |
| 3,061,219 | 10/1962 | Groves | 242—55.12 |

FOREIGN PATENTS 673,275  6/1952  Great Britain.

FRANK J. COHEN, *Primary Examiner.*

L. D. CHRISTIAN, *Assistant Examiner.*